United States Patent [19]

Tamai

[11] Patent Number: 5,151,115

[45] Date of Patent: Sep. 29, 1992

[54] MAGNETIC POWDER FOR MAGNETIC RECORDING MEDIA AND METHOD FOR PRODUCING SAME

[75] Inventor: Kiminori Tamai, Tokyo, Japan

[73] Assignee: TDK Corporation, Tokyo, Japan

[21] Appl. No.: 598,584

[22] Filed: Oct. 15, 1990

Related U.S. Application Data

[63] Continuation-in-part of Ser. No. 320,254, Mar. 7, 1989, abandoned.

[30] Foreign Application Priority Data

Apr. 7, 1988 [JP]   Japan .................................. 63-84076

[51] Int. Cl.⁵ ............................................... B22F 1/02
[52] U.S. Cl. ........................................ 75/348; 75/369; 148/105
[58] Field of Search .................... 75/348, 350, 369; 148/105

[56] References Cited

U.S. PATENT DOCUMENTS

| | | | |
|---|---|---|---|
| 4,133,677 | 1/1979 | Matsui et al. | 75/5 AA |
| 4,447,264 | 5/1984 | Suzuki et al. | 75/5 BA |
| 4,576,635 | 3/1986 | Araki et al. | 75/5 AA |
| 5,039,553 | 8/1971 | Fukumoto et al. | 148/105 |

FOREIGN PATENT DOCUMENTS

| | | | |
|---|---|---|---|
| 133505 | 10/1980 | Japan | 75/5 AA |
| 3605 | 1/1981 | Japan | 75/5 BA |
| 1-257309 | 10/1989 | Japan . | |

*Primary Examiner*—George Wyszomierski
*Attorney, Agent, or Firm*—Seidel, Gonda, Lavorgna & Monaco

[57] ABSTRACT

A metal magnetic powder for magnetic recording media consisting essentially of iron is obtained by providing a hydrous needle-like iron oxide powder as a starting material, applying cobalt ions on the surface thereof, and subsequently reducing the resultant powder in a reducing atmosphere. The metal magnetic powder contains cobalt in an amount not less than 6 weight % relative to iron, and the coercive force of the powder is not more than 1600 Oe.

2 Claims, 1 Drawing Sheet

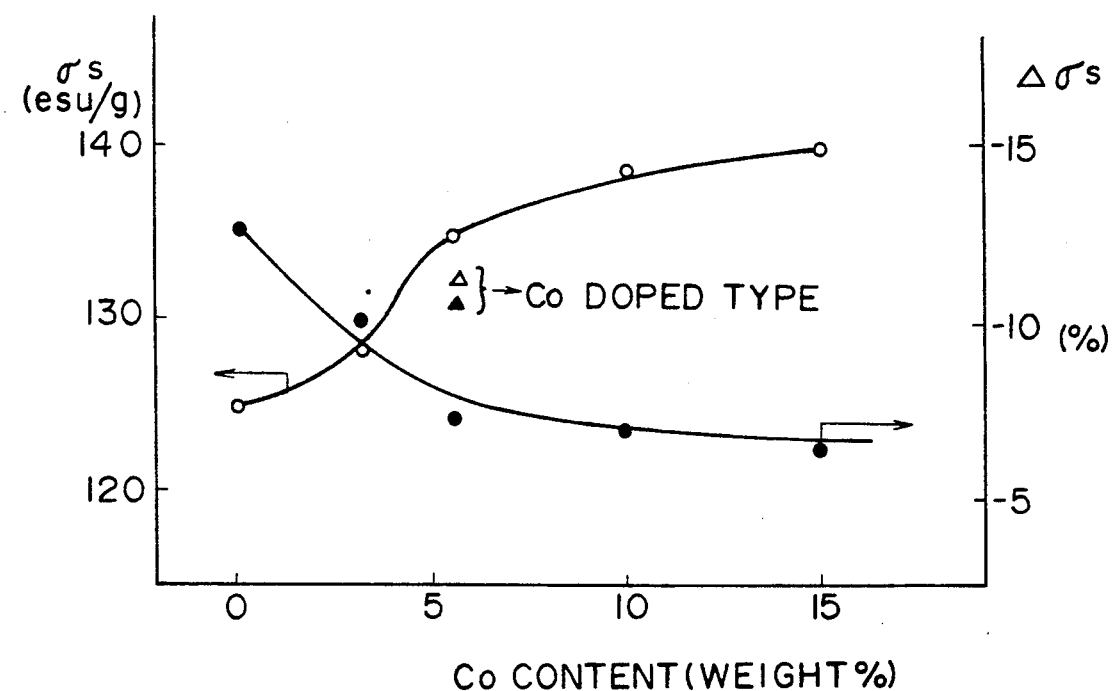

MAGNETIC POWDER FOR MAGNETIC RECORDING MEDIA AND METHOD FOR PRODUCING SAME

This is a continuation-in-part of co-pending application Ser. No. 320,254 filed on Mar. 7, 1989, abandoned.

BACKGROUND OF THE INVENTION

1. Field of the Invention

This invention relates to a metal magnetic powder for magnetic recording media, and more particularly relates to a metal magnetic powder having an excellent stability, and a method of producing the same.

2. Description of the Prior Art

There is an increasing demand for high-density recording in the 8-mm video tape, DAT, magnetic disc or the like. Prerequisites for a magnetic recording medium suitable for high-density recording are that the saturation magnetization of the magnetic powder for the medium is as large as possible, and the coercive force of the powder is as high as possible, or the like. As a magnetic powder which satisfies these prerequisites, there is a metal magnetic powder which consists mainly of iron, and to which cobalt, nickel and the like are added. It is necessary to maintain the magnitude of the coercive force $H_c$ of the powder within such an extent that the magnetic head is not saturated. The coercive force of about 1600 Oe is satisfactory, and, in general, the coercive force is greater than 1300 1100 Oe, but not greater than 1600 Oe is desirable.

On the other hand, the magnetic recording medium functions better as the saturation magnetization of the magnetic powder is higher. Hence, high saturation magnetization is being required.

However, the metal powder is easily oxidized because it is very active. Hence, there is a problem that, although the metal powder has a high saturation magnetization immediately after its production, the saturation magnetization of the metal powder is largely decreased due to oxidation.

In order to improve such instability, there have been tried that oxide films are positively formed on the surfaces of particles of the metal powder, or other oxidation-preventing coatings are formed on the surfaces. These attempts have resulted in, however, insufficient stability, or insufficient magnitude of saturation magnetization.

SUMMARY OF THE INVENTION

It is an object of the present invention to increase the saturation magnetization of a metal magnetic powder consisting essentially of iron for magnetic recording media, and stably maintain the magnitude thereof.

The present invention is a method for producing a metal magnetic powder consisting essentially of iron for magnetic recording media comprising the steps of, providing a hydrous needle-like iron oxide powder as a starting material, applying cobalt ions on the surface thereof, and subsequently reducing the resultant powder in a reducing atmosphere, cobalt being contained in an amount not less than 6 weight % relative to iron, and the coercive force of the powder being greater than 1300 Oe, but not more than 1600 Oe, and a metal magnetic powder thus produced. Although the coercive force depends also on the content of cobalt, in order to obtain a coercive force greater than 1300 Oe, but not more than 1600 Oe with a high cobalt content capable of maintaining the stability of saturation magnetization, it is necessary that the long axis of the hydrous needle-like iron oxide powder is 0.25–0.50 μm, the short axis of the same is 0.015–0.035 μm and the long axis/short axis ratio is 10–20.

The metal magnetic powder, consisting essentially of iron and coated with cobalt according to the present invention, has a coercive force which is suitable for high-density recording but which does not result in the saturation of the magnetic head. At the same time, the powder can maintain a large saturation magnetization. Hence, it is possible to produce magnetic recording media having excellent magnetic recording and reproducing characteristics.

BRIEF DESCRIPTION OF THE DRAWING

The drawing is a graph showing the saturation magnetization and its rate of variation of magnetic powders according to the present invention and a comparative example.

DETAILED DESCRIPTION OF THE INVENTION

The present invention provides a metal magnetic powder consisting of iron coated with cobalt. Heretofore, metal iron powders containing cobalt have already been opened to the public. However, the techniques for obtaining these powders aim at providing magnetic powders suitable for high-density recording mainly by increasing the coercive force of the powders, and do not aim at large saturation magnetization and stabilization thereof except for a few cases.

In Japanese Patent Public Disclosure (Kokai) No. 60-92446 (1985), a magnetic powder having high saturation magnetization and high stability against oxidation has been obtained, by impregnating cobalt on the surface of α-iron oxide, and subsequently performing reduction processing. It is also described that stability against oxidation is decreased when the content of cobalt becomes not less than 6 weight %. According to the investigations by the present inventors, however, it has been found that, even though this description may be correct relative to α-iron oxide, there is a lack in stability within this range relative to hydrous needle-like iron oxide (α-FeOOH). On the contrary, in the present invention, it has been found that it is possible to obtain a metal magnetic powder for magnetic recording media having an excellent stability and large saturation magnetization, by applying cobalt ions to hydrous needle-like iron oxide in such a quantity that a content of cobalt not less than 6 weight % is obtained after reduction, and subsequently reducing the resultant powder in a reducing atmosphere.

Further, in Japanese Patent Public Disclosure (Kokai) No. 59-107503 (1984), there is a description that a metal magnetic powder having a high coercive force and a high saturation magnetization is obtained by applying or diffusing to the surface and/or interior of α-iron oxide or hydrous needle-like iron oxide, and subsequently reducing the resultant powder in a reducing atmosphere. In the technique of this Disclosure, however, it has been particularly intended to obtain a magnetic material having a high coercive force not less than 1600 Oe, and attention has not been paid at all to the stability of magnetic properties. That is, examples in which cobalt ions are applied to hydrous needle-like iron oxide are limited to a cobalt content of not more than about 5 weight %, and examples in which the cobalt ion content is not less than 5 weight % are limited to α-iron oxide, cobalt-doped hydrous iron oxide and the like. In the former examples, there is a lack in stability as in the above-described Disclosure, and in the latter examples, although resistance against oxidation is excellent, there is an instability which is characteristic for the doped-type. In the present invention, a metal magnetic powder for magnetic recording media having an extremely excellent stability has been obtained, by applying cobalt to hydrous needle-like iron oxide not containing cobalt, in a ratio as high as not less than 6 weight %. The technique of the present invention is not suggested from the conventional techniques.

In the present invention, a hydrous needle-like iron oxide, a starting material, is processed in an alkaline aqueous solution containing a sufficient amount of cobalt ions required for applying cobalt ions to the iron oxide in such a quantity that the cobalt content after reduction is not less than 6 weight %. The processed iron oxide is subsequently processed or not processed by a stabilizer, such as $Na_2SiO_3$ or the like, and then reduced in a reducing atmosphere, such as hydrogen or the like. These processes can easily be executed using the methods described in the above-referred Disclosures.

In the present invention, hydrous needle iron oxide not containing cobalt is used as the starting material. That is, since unstable properties are obtained when cobalt is contianed, cobalt must not substantially be included. Such needle-like iron oxide powder must have an average long axis of 0.25–0.50 μm, an average short axis of 0.015–0.035 μm, and a long axis/short axis ratio of 10–20, in order to have a coercive force greater than 1300 Oe, but not more than 1600 Oe. It is not desirable that the ratio of axes is too large, since the coercive force exceeds 1600 Oe. When the ratio of axes is too small, the coercive force becomes not more than 1100 Oe, which value is insufficient for high-density recording.

The hydrous needle-like iron oxide is impregnated with cobalt ions in the form of solution. The concentration of cobalt ions must be such that the applied amount of cobalt is finally not less than 6 weight % on the basis of metal iron. Further, the upper limit of that amount must be 20 weight %. The content exceeding this limit results in a coercive force which is too high.

Next, embodiments of the present invention will be explained.

EXAMPLE 1

100 g. of Needle-like α-FeOOH not containing cobalt and having an average long-axis length of 0.50 μm and an average short-axis length of 0.025 μm was thrown in 6 l. of water, and mixed by stirring with a stirrer. 64 ml. of 1 mol/l. cobalt sulfate solution was added thereto, and after stirring, 70 g. of 2 mol/l. NaOH solution was further added, and stirred for about 30 minutes. Then, 1 l. of an aqueous solution, in which 3 weight % $Na_2SiO_3$ relative to Fe was added, was added thereto, and after sufficient stirring, the resultant solution was filtered, washed and dried. 10 g. of the needle-like α-FeOOH thus obtained, to the surface of which cobalt hydroxide was applied, was collected, and reduced at a temperature of 450° C. and a hydrogen flow rate of 1l./min. for 6 hours. Next, after cooling down to room temperature, the sample was immersed in a toluene solution blowing air for ten minutes, and then dried in air. The Co/Fe weight ratio was 6.0%.

EXAMPLE 2

The same operation as in Example 1 was performed, except that needle-like α-FeOOH not containing cobalt and having an average long-axis length of 0.40 μm and an average short-axis length of 0.035 μm was used, the added amount of the cobalt sulfate solution was changed to 120 ml. and the added amount of the NaOH solution was changed to 140 ml. The Co/Fe weight ratio was 10.3%.

EXAMPLE 3

The same operation as in Example 1 was performed, except that needle-like α-FeOOH not containing cobalt and having an average long-axis length of 0.25 μm and an average short-axis length of 0.025 μm was used, the added amount of the cobalt sulfate solution was changed to 160 g., and the added amount of the NaOH solution was changed to 180 g. The Co/Fe weight ratio was 10.5%.

EXAMPLE 4

The same operation as in Example 1 was performed, except that needle-like α-FeOOH not containing cobalt and having an average long-axis length of 0.25 μm and an average short-axis length of 0.015 μm was used. The Co/Fe weight ratio was 6.0%.

COMPARATIVE EXAMPLE 1

The same operation as in Example 1 was performed, except that needle-like α-FeOOH not containing cobalt and having an average long-axis length of 0.45 μm and an average short-axis length of 0.025 μm was used. and neither cobalt sulfate solution nor NaOH solution was added.

COMPARATIVE EXAMPLE 2

The same operation as in Example 1 was performed, except that needle-like α-FeOOH not containing cobalt and having an average long-axis length of 0.42 μm and an average short-axis length of 0.025 μm was used, the added amount of cobalt sulfate solution was 33 ml. and the added amount of NaOH solution was 36 ml. The Co/Fe weight ratio was 3.1%.

COMPARATIVE EXAMPLE 3

The same operation as in Example 1 was performed, except that needle-like α-FeOOH, to which 6 weight % cobalt relative to iron was doped, having an average long-axis length of 0.42 μm and an average short-axis length of 0.025 μm was used, and neither cobalt sulfate solution nor NaOH solution was added.

COMPARATIVE EXAMPLE 4

The same operation as in Example 1 was performed, except that needle-like α-FeOOH was used, to which 2 weight % cobalt relative to iron was doped, having an average long-axis length of 0.25 μm and an average short-axis length of 0.018 μm, the added amount of the cobalt sulfate solution was 44 ml. and the added amount of the NaOH solution was 47 ml. The content of cobalt was finally made 6 weight %.

Various properties of magnetic powders in the above-described Examples and Comparative Examples were measured. The results are shown in the following table.

| Example | 1 | 2 | 3 | 4 |
| --- | --- | --- | --- | --- |
| Co/Fe (wt %) | 6.0 | 11.3 | 15.1 | 6.0 |
| Hc (Oe) | 1545 | 1570 | 1597 | 1580 |
| $\sigma_s$ (emu/g) | 134 | 138 | 140 | 134 |
| $\sigma_s$ *1 | 124 | 128 | 131 | 123 |
| Reduced ratio of $\sigma_s$ (%) | 7.5 | 7.2 | 6.4 | 8.2 |
| Comparative Example | 1 | 2 | 3 | 4 |
| Co/Fe (wt %) | 0 | 3.1 | 6.0 | 16.0 |
| Hc (Oe) | 1485 | 1500 | 1540 | 1790 |
| $\sigma_s$ (emu/g) | 125 | 128 | 132 | 134 |
| $\sigma_s$ *1 | 110 | 115 | 117 | 120 |
| Reduced ratio of $\sigma_s$ (%) | 12.0 | 10.2 | 11.4 | 10.4 |

*1: After storage at 60° C., for 7 days

Among the results in the above table, the dependency of saturation magnetization and the reduced ratio thereof on the cobalt content is shown in the drawing. In the drawing, points indicated by white circles show saturation magnetization when needle-like α-FeOOH not containing cobalt is used, and various amounts of cobalt are added, and points indicated by black circles show the ratio of deterioration of saturation magnetization. Points indicated by a white triangle and a black triangle show the results for a conventional cobalt-doped-type sample (Comparative Example 3).

As is apparent from the results described above, according to the present invention, it becomes possible to provide a magnetic powder which has an Hc greater than 1300 Oe, but not more than 1600 Oe and an extremely excellent stability, by using needle-like α-FeOOH obtained from a needle-like metal magnetic material consisting essentially of iron without doping cobalt, adding cobalt in an amount not less than 6 weight %, and subsequently performing reduction processing.

EXAMPLE 5

Example 1 was repeated except that α-FeOOH containing no Co, and having an average long axis of 0.5 μm and an average short axis of 0.035 μm was used, a reducing temperature of 400° C. was used, and a flow rate of hydrogen of 2 liters/min. was used.

EXAMPLE 6

Example 1 was repeated except that α-FeOOH containing no Co, and having an average long axis of 0.45 μm and an average short axis of 0.03 μm was used, a reducing temperature of 420° C. was used, and a hydrogen flow rate of 2 liters/min. was used.

The following results were obtained from Examples 5 and 6:

| Example | 5 | 6 |
| --- | --- | --- |
| Co/Fe (wt %) | 6.0 | 6.0 |
| Hc (Oe) | 1350 | 1455 |
| $\sigma_s$ (emu/g) | 142 | 141 |
| $\sigma_s$* | 132 | 132 |
| Reduced ratio | 7.0 | 6.4 |

*After storage at 60° C. for 7 days.

What is claimed is:

1. A method for producing a metal magnetic powder for magnetic recording media comprising the steps of providing hydrous needle-like iron oxide not containing cobalt powder as a starting material wherein the long axis of the hydrous needle-like iron oxide is 0.25–0.50 μm, the short axis of said oxide is 0.015–0.035 μm, and the long axis/short axis ratio is 10–20, applying cobalt ions to the surface thereof so that the cobalt content becomes not less than 6 weight % after reduction, and reducing the resultant powder in a reducing atmosphere, said powder having a coercive force greater than 1300 Oe, but not greater than 1600 Oe.

2. A method for producing a metal magnetic powder for magnetic recording media comprising the steps of providing a hydrous needle-like iron oxide powder not containing cobalt as a starting material wherein the long axis of the hydrous needle-like iron oxide is 0.25–0.50 μm, the short axis of said oxide is 0.015–0.035 μm, and the long axis/short axis ratio is 10–20, processing said powder in an alkaline aqueous solution containing an amount of cobalt ions sufficient for applying cobalt ions to the surface of the powder so that the cobalt content of the powder becomes not less than 6 weight % after reduction, subsequently processing the resultant powder in $Na_2SiO_3$, and then reducing the resultant powder in a reducing atmosphere, said powder having a coercive force greater than 1300 Oe, but not greater than 1600 Oe.

* * * * *